Dec. 24, 1957 D. T. AYERS, JR 2,817,410
BOOSTER BRAKE MECHANISM
Filed March 19, 1956 4 Sheets-Sheet 1
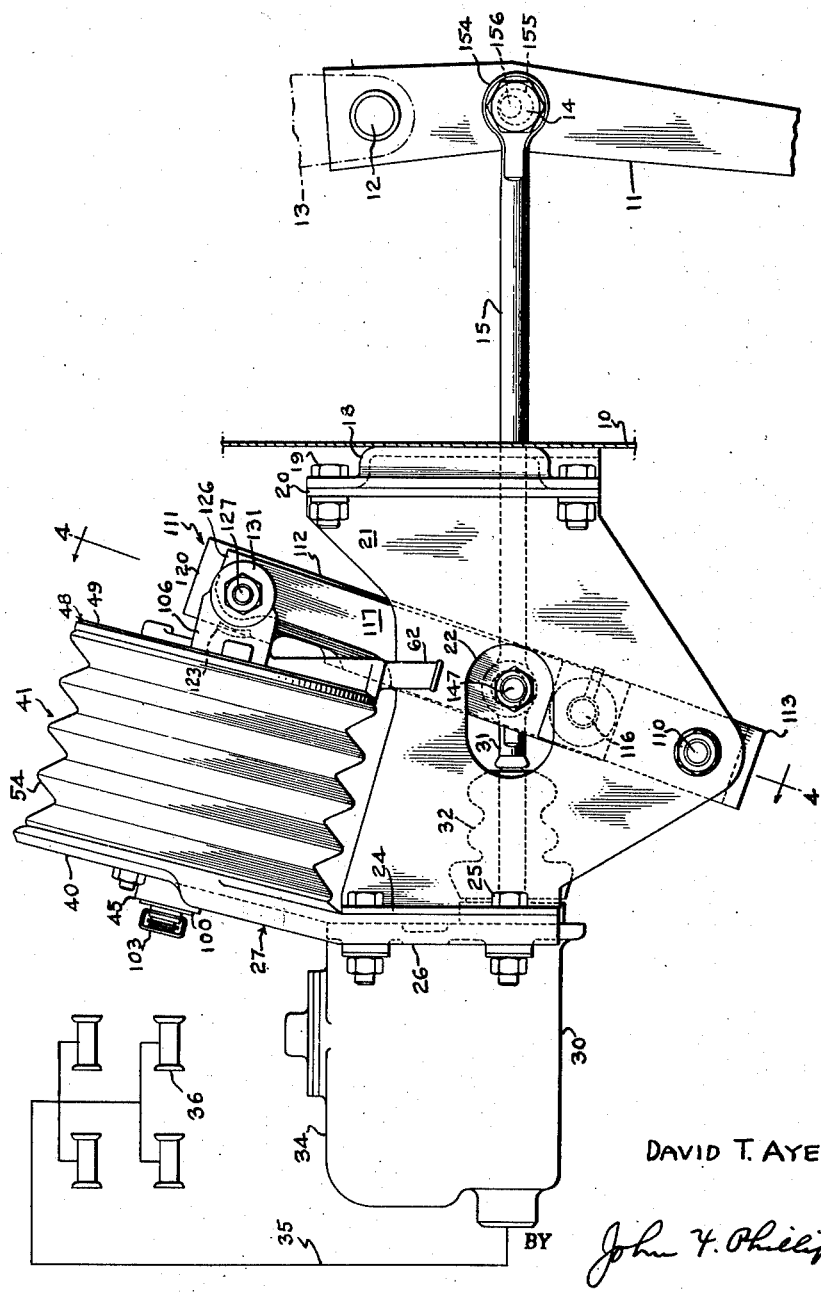
INVENTOR
DAVID T. AYERS JR.
BY John F. Philips
ATTORNEY

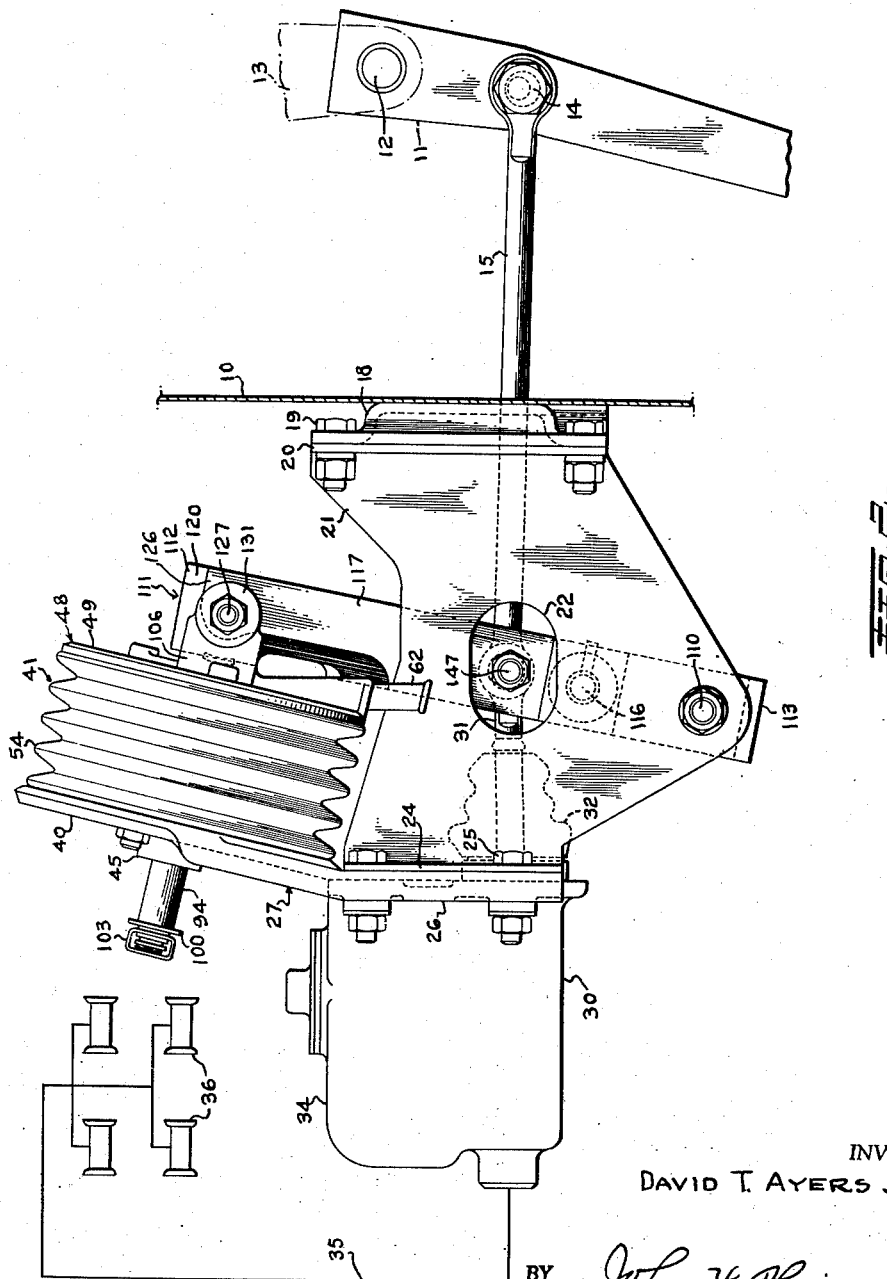

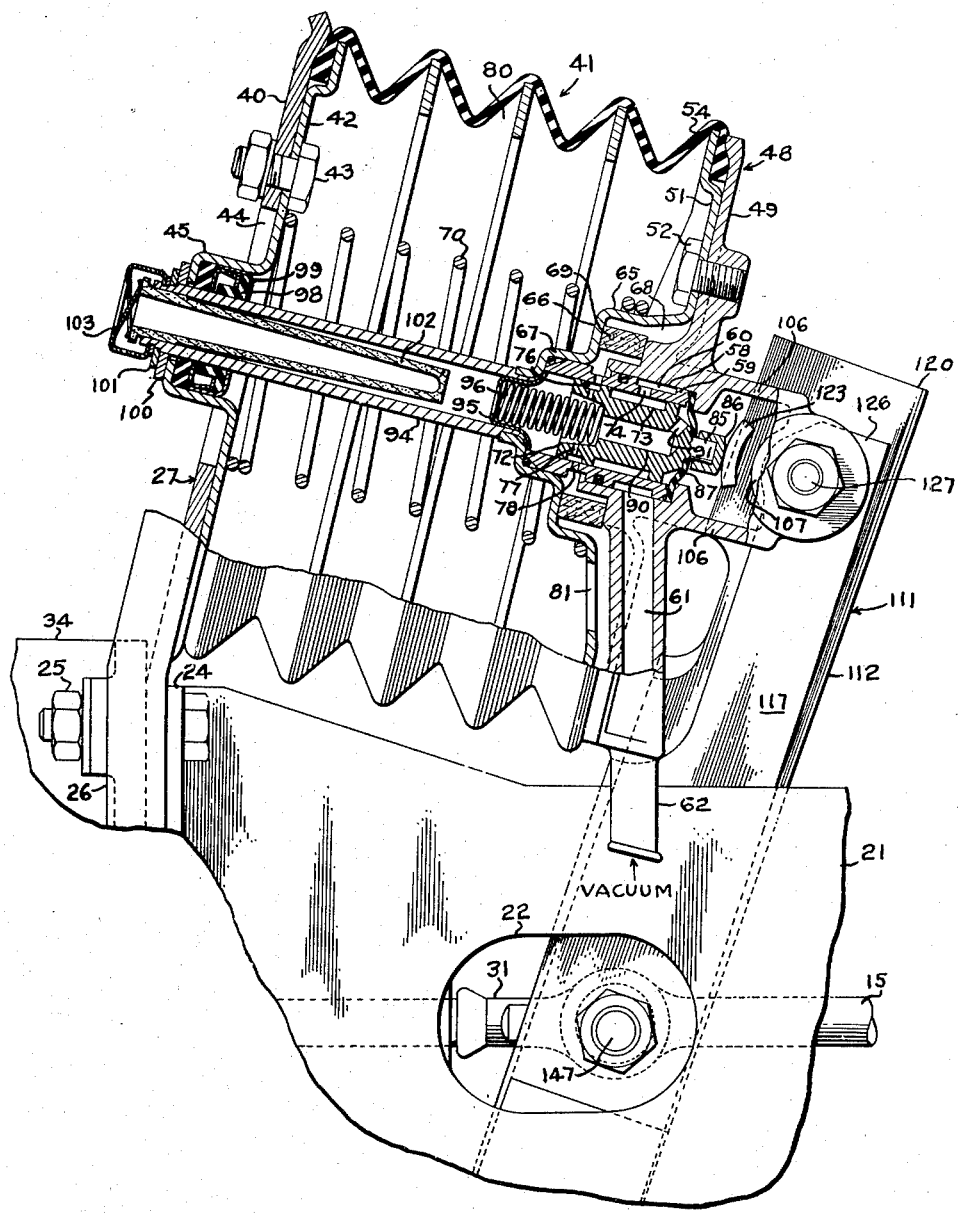

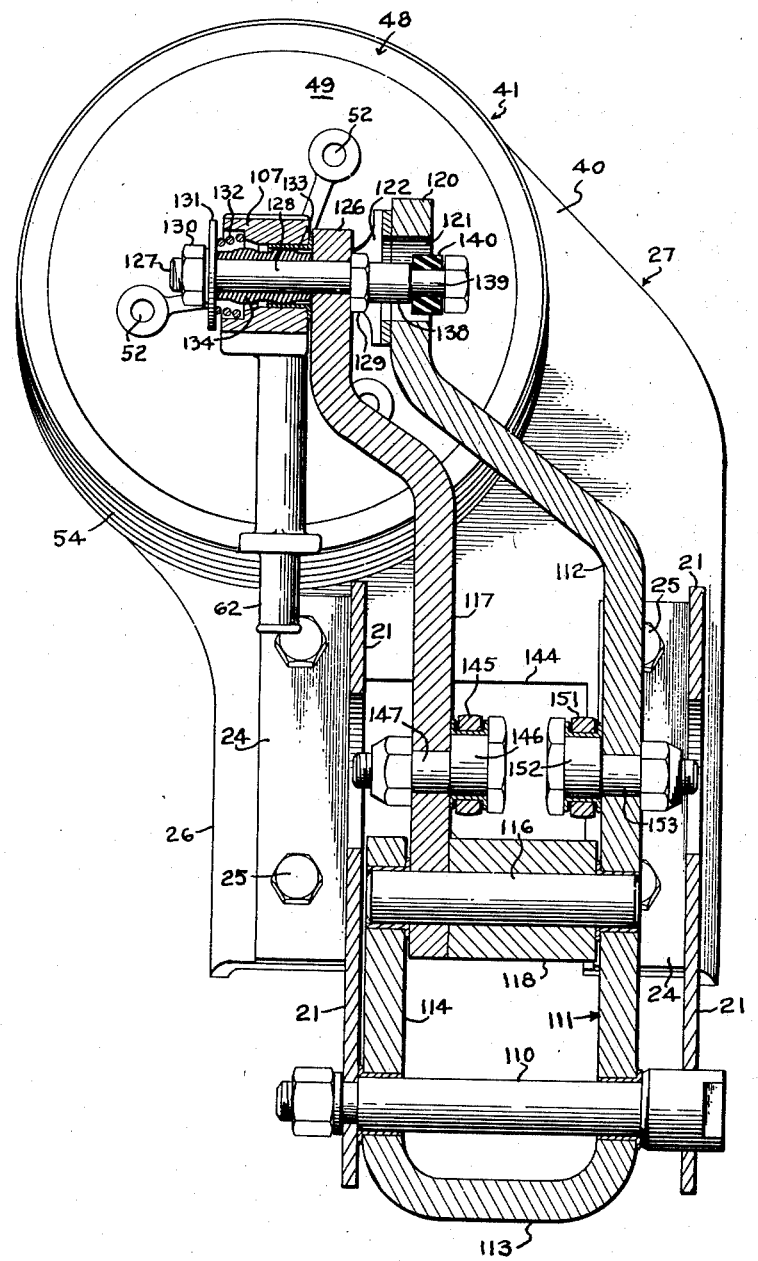

United States Patent Office 2,817,410
Patented Dec. 24, 1957

2,817,410

BOOSTER BRAKE MECHANISM

David T. Ayers, Jr., Birmingham, Mich., assignor to Kelsey-Hayes Company, a corporation of Delaware Application March 19, 1956, Serial No. 572,431

18 Claims. (Cl. 180—90)

This invention relates to a booster brake mechanism.

Several practicable booster brake mechanisms have been developed for use in motor vehicles, wherein a brake pedal of the hanging type operates in conjunction with a power lever operable by a fluid pressure motor connected between the power lever and the fire wall of the vehicle beneath the dashboard thereof. Some such devices have been found highly practicable in operation, but they have some disadvantages, particularly under certain conditions. For example, in some motor vehicles there is insufficient space between the power lever and the fire wall for the mounting of the booster motor. Moreover, some objection has been voiced to devices of this kind for the reason that the booster motor is visible from the front seat of the vehicle. Additionally, except in special mountings, the operation of the motor is clearly audible, not only with respect to contact between moving parts of the apparatus but also with respect to the rush of air into and out of the motor as the motor is energized and de-energized. Moreover, devices of this character must be assembled unit by unit on the vehicle.

An important object of the present invention is to provide a novel booster brake mechanism wherein the entire mechanism is mounted forwardly of the fire wall, that is, in the engine compartment, and is connected to the panel to be operated and controlled thereby through the medium of a single rod similar to the present rod connected to the hanging brake pedal for operating a conventional master cylinder.

A further object is to provide a mechanism of the character referred to which is capable of complete assembly as a unit prior to being installed on a vehicle, thus rendering the apparatus highly practicable for use as an original installation or as an accessory.

A further object is to provide a mechanism of the character described which is capable of being mounted in the engine compartment of the vehicle at a location therein in which ample space is provided for the installation.

A further object is to provide such a unit which is capable of being mounted in the engine compartment forwardly of the fire wall, thus materially reducing operational noises in the driver's compartment, and to provide means within the booster motor for further quieting sounds of operation in the apparatus.

Other objects and advantages of the invention will become apparent during the course of the following description.

In the drawings I have shown one embodiment of the invention. In this showing:

Figure 1 is a side elevation of the mechanism, the vehicle fire wall being shown in section and the wheel cylinders of the vehicle being diagrammatically indicated, the parts being shown in their normal "off" brake positions;

Figure 2 is a similar view showing the positions of the parts when the brakes are applied;

Figure 3 is an enlarged fragmentary sectional view of the motor and associated elements, portions of the motor being shown in axial section; and Figure 4 is an enlarged detail sectional view on line 4—4 of Figure 1.

Referring to Figures 1 and 2, the numeral 10 designates the fire wall of the vehicle rearwardly or to the right of which is the driver's compartment and to the left or forwardly of which is the engine compartment of the vehicle. A brake pedal 11 of the hanging type has been partially illustrated and the present invention is particularly, but not necessarily, intended for use with a brake pedal of such type. The upper end of the brake pedal is pivotally connected as at 12 to any suitable support, generally designated by the numeral 13. At a point spaced below the fixed pivot 12, the brake pedal is pivotally connected as at 14 to one end of a forwardly extending rod 15. The pivotal connection 14 will be further referred to below. A rod of this type is generally employed for transmitting movement from the brake pedal to a conventional master cylinder, but is otherwise utilized in the present construction, as further described below.

A supporting member 18 is suitably rigidly secured to the fire wall 10 forwardly thereof and is bolted as at 19 to flanges 20 formed integral with the rear edges of spaced rigid side plates 21 (Figures 1, 2 and 4). The plates 21 are substantially spaced from each other transversely of the vehicle and are provided with transversely alined openings 22 of substantial size for a purpose which will become apparent.

The forward edges of the side plates 21 are provided with flanges 24 bolted as at 25 to the lower portion 26 of a bracket indicated as a whole by the numeral 27. The bracket portion 26 is substantially vertically arranged, as shown in Figures 1 and 2.

The bolts 25 also serve to secure in position relative to the flanges 24 and bracket 27 a conventional master cylinder 30 having the usual fluid displacing piston (not shown) therein, operative by a rod 31 which conventionally is the forward end of the rod 15, these rods being wholly separate in the present invention. The rod 31 is surrounded adjacent the bracket end 26 by a conventional boot 32. The master cylinder 30 is provided with a conventional reservoir 34, and the master cylinder is connected by lines 35 to the vehicle wheel cylinders 36.

The bracket 27 has an upper end 40 inclined upwardly and rearwardly as shown in Figures 1, 2 and 4. The bracket end 40 serves as a support, in a manner to be described, for one end of a motor indicated as a whole by the numeral 41. This motor is of the vacuum operated bellows type and comprises a forward stationary head 42, bolted as at 43 to the bracket end 40 to be rigidly supported thereby. The bracket end 40 is provided with an opening 44 through which projects an axial extension 45 carried by the motor head 42 for a purpose to be described.

The motor 41 further comprises a movable head indicated as a whole by the numeral 48 and comprising a preferably die-cast body 49 against which is secured a clamping plate 51 by means of screws 52. Between the members 49 and 51 is clamped the forward extremity of a bellows 54, and the rear end of this bellows is clamped between the stationary head 42 and the bracket end 40.

The body 49 of the movable motor head is provided with a bore 58 in which is arranged the rear end of a valve sleeve 59 having a relatively long external annular groove 60 in fixed communication with a duct 61 formed in the body 49 and terminating at its lower end (Figure 3) in a nipple 62 adapted for connection with a flexible hosing leading to a suitable source of vacuum.

The clamping plate 51 is provided with a relatively large forwardly extending annular portion 65 turned inwardly as at 66 and then forwardly as at 67 to form an annular sleeve portion in which the forward end of the valve sleeve 59 is received. The portion 65 of the clamping plate 51 forms with the body 49 a chamber 68 in which is arranged a combined air cleaner and sound-dampening element 69 in the form of a felt or similar ring. A return spring 70 for the movable motor head 48 surrounds the annular portion 65 of the plate 51 and engages at its opposite end with the stationary head 42.

A spool valve 72 is slidable in the sleeve 59 and is provided with a relatively long annular groove 73 communicating with the groove 60 through ports 74. Regardless of the position of the valve 72, it will be apparent that the grooves 60 and 73 are always in communication with each other end, accordingly, vacuum is always present in the groove 73.

The left-hand end portion of the valve 72 is provided with a substantially shorter annular groove 76 communicating with the interior of the valve 72 through radial ports 77. In the normal position of the valve 72, groove 76 communicates through ports 78 with the chamber 68 inwardly of the air cleaner 69. The chamber 68 communicates with the variable pressure motor chamber 80 through a port 81 formed in the clamping plate 51. Since the groove 76 is always in communication with the atmosphere and normally communicates with the space 68, it will be apparent that atmospheric pressure is normally present in the motor chamber 80.

The rear or right end of the valve 72 (Figure 3) is provided with an axially extending button 85 having a cap 86 thereon preferably formed of molded nylon. The inner periphery of a sealing diaphragm 87 surrounds the button 85 and has its peripherally outer edge arranged between the rear end of the valve sleeve 59 and the rear extremity of the bore 58. The valve 72 is provided with an axial bore 90 communicating through a port 91 with the space between the diaphragm 87 and valve 72 to insure the maintenance of atmospheric pressure in such space.

The forward or left-hand extremity of the clamping plate 51 axially thereof is secured to the rear end of a tubular piston rod 94 within which is arranged a spring seat 95 engaged by the rear end of a valve return spring 96, the forward end of this spring engaging the valve 72 as shown in Figure 3. The valve, accordingly, is biased to a motor de-energizing position.

The forward end of the tubular piston rod 94 extends through suitable sealing and bearing means 98 arranged in the stationary head extension 45, such means including a ring 99 pressed into the extension 45 to maintain the bearing and sealing means in position. The tubular piston rod extends beyond the extremity of the member 45 and has a stop member 100 engageable with the extension 45 and maintained in position by a snap ring 101. Within the forward end of the tubular piston rod is arranged a porous air cleaner 102 which may be in the form of a molded sintered metallic element, and such element is maintained in position by a clip 103.

The body 49 of the movable motor head is provided with preferably integral rearwardly extending yoke members 106. Formed integral with the rear ends of such members is a hub 107 acting as a connection through which the power of the motor is delivered, in a manner to be described, to a power operated lever.

The side walls 21 constitute a supporting means for a lever mechanism associated with the motor 41, master cylinder 30 and pedal lever 11. Referring particularly to Figure 4, the lower portions of the side walls 21 carry a relatively heavy pivot pin 110 supporting an operating lever indicated as a whole by the numeral 111. This lever comprises a relatively long lever arm 112, and the lever is bent back upon itself beneath the pivot pin 110 as at 113 and then turns upwardly as at 114 to form a relatively short lever arm parallel to the lever arm 112. It will be apparent that the lever 111 is wholly supported by the pivot pin 110.

Near the upper end of the relatively short arm 114, which is substantially spaced from the arm 112, is arranged a pivot pin 116 extending through and supported by the lever arms 112 and 114. The pivot pin 116 has fixed thereto the lower end of a power lever 117 arranged adjacent the lever arm 114, the space between the power lever 117 and lever arm 112 being filled by a collar 118 fixed to the shaft 116 and preferably welded to the lever 117 to form a unit therewith.

The upper end of the lever arm 112 extends inwardly toward the axis of the motor 41 and terminates in a vertical upper end 120 having an opening 121 therein for a purpose to be described. The upper end 120 of the lever 112 is provided with a laterally extending valve operating element 122 the extremity 123 (Figure 3) of which is curved and has its convex side engaging the cap 86. It will be apparent that swinging movement of the lever 111 counterclockwise about the pivot pin 110, as viewed in Figures 1, 2 and 3, will move the valve 172.

As viewed in Figure 4, the upper end of the power lever 117 extends to the left toward the axis of the motor 10 and then turns upwardly to form a vertical end 126 adjacent and parallel to the lever end 120. A pivot pin 127 is carried by the lever end 126 and has a shank 128 projecting through the hub 107, as shown in Figure 4. A head 129 is formed on the shank 128 and engages the side of the lever end 126 opposite the hub 107. A nut 130 is threaded on the shank 128 at the opposite side of the hub 107 and maintains in place a washer 131. Between this washer and the hub 107 is arranged a take-up spring 132 which tends to maintain the lever end 126 against a bushing 133 projecting into one end of the hub 107. A bearing bushing 134 surrounds the shank 128 and engages at opposite ends against the lever end 126 and washer 131. It will be noted that the bushing 134 is provided with two outer spherical surface portions one of which is arranged in and contacts with the bushing 133. The purpose in using two spherical surfaces on the bushing 134 is to prevent this bushing from being inserted backwards in assembling the device.

To the right of the head 129 (Figure 4) the pivot pin 127 is provided with an eccentric 138 having a reduced portion 139 surrounded by a rubber collar 140. This collar is arranged in the opening 121. Such opening is somewhat larger than the collar 140 to provide a lost motion connection between the lever ends 120 and 126 whereby, in the initial operation of the apparatus as described below, the lever 111 is adapted to turn independently of the lever 117 to move the valve 72 (Figure 3) and operate the motor 41.

The bracket 27 (Figure 4) is provided in the wall thereof with an opening 144 through which projects the rod 31 connected to the piston of the master cylinder 30. The rear end of this rod is provided with a collar 145 surrounding an eccentric 146 carried by a stem 147 secured to the lever 117.

The operating rod 15 is connected to the lever 111. The forward end of the rod 15, which projects through the fire wall 10, is provided at its forward end with a collar 151 rotatably surrounding an eccentric 152 carried by a stem 153 secured to the lever arm 112. The rear end of the rod 15 (Figure 1) is provided with a collar 154 surrounding an eccentric 155 carried by a stem 156 and constituting the pivot 14.

The eccentric 155 and its stem 156 may be substantially identical with the eccentrics 146 and 152 and the stems by which they are carried. The purpose of the eccentrics 138, 146, 152, and 155 is to provide for adjustment of the parts with which such eccentrics are associated, as will be obvious.

Operation

The parts of the apparatus normally occupy the positions shown in Figures 1 and 3. It will be noted in Figure 3 that the vacuum groove 73 communicates with the source of vacuum through the groove 60 and duct 61, but the groove 73 is out of communication with the ports 78. The air groove 76 communicates with the motor through the ports 78, and accordingly atmospheric pressure will be present in the motor chamber 80. When the brakes are to be applied, the operator will push the usual pedal pad (not shown) carried by the pedal lever 11, thus moving the rod 15 to the left as viewed in Figure 1. This motion is transmitted through the eccentric 152 (Figure 4) and pin 153 to the lever 111 to rock it about its fixed pivot pin 110. The upper end of the lever arm 112 moves to the left as viewed in Figures 1, 2 and 3, and the valve operating element 123 will press against the cap 86 to move the valve 72 to the left of its normal position shown in Figure 3. The groove 76 will be moved out of communication with the ports 78, followed by a movement of the groove 73 into registration with such ports, thus connecting the motor chamber 80 to the vacuum groove 73. Thus air will be evacuated from the motor chamber 80 and since the motor head 42 is fixed, the movable head 48 will start to move to the left in Figure 3.

Movement of the motor head 48 will be communicated through the yoke arms 106 and hub 107 to the upper end 126 of the power lever 117. This lever will be turned counterclockwise about the pivot pin 116 as viewed in Figures 1 and 2.

The rubber collar or bushing 140 (Figure 4) will have been initially out of engagement with the far side of the opening 121 as viewed in Figure 4, and accordingly initial valve operating movement of the lever 112 takes place independently of the upper end of the lever 117. Such movement of the lever 112, however, will impart slight movement of the pivot pin 116 to the left (Figures 1 and 2) to impart some slight movement to the master cylinder push rod 31. The relative lengths of the lever arms provided by the apparatus as shown prevent substantial resistance to initial movement of the brake pedal, hence an initially "soft" pedal is provided.

Upon energization of the motor, movement of the movable motor head 48 transmits power to the upper end of the lever 117, and this lever, turning about the pivot pin 116, will deliver power through the push rod 31 to the master cylinder piston. Thus two forces will be applied to such piston, namely, the force applied to the pivot pin 116 by the pedal lever, and the force applied by the power lever through the pin 147. The power lever tends to pivot on the axis of the pin 147, thus providing an opposite reaction force against the pin 116. This reaction force is transmitted through the operating lever 111 and rod 15 to the pedal 11, thus providing the operator with a reaction "feel" proportionate to the degree of brake application. The combined forces of the two levers 111 and 117 will displace fluid from the master cylinder 30, and such fluid flows through lines 35 to the wheel cylinders 36 to apply the brakes.

If, when the pedal 11 is operated, no vacuum is available for the motor 41, the lever end 120 will move as previously described and the near side of opening 121 will exert a force against the rubber bushing 140 and thence through pin 128 to the power lever 117. Accordingly, both levers 111 and 117 will turn as a unit and the operator may manually apply the brakes. Moreover, the same result will occur beyond the point of "power run-out" or maximum energization of the motor 41. Up to such point, brake operation takes place with the rubber bushing 140 out of contact with either side of the opening 121 (Figure 4). If braking forces are required beyond the point of power run-out as referred to, further additional forces applied to the pedal lever 11 will move the lever end 120 relative to the lever end 126, causing the near side of the opening 121, as viewed in Figure 4, to engage the bushing 140. Beyond such point, the levers 111 and 117 will turn as a unit.

When the brake pedal is released, the valve spring 96 will return the valve 72 to its normal position shown in Figure 3, again connecting the motor chamber 80 with the atmosphere. The return spring 70 thereupon returns the movable head 48 to the off position shown in Figure 3. All of the parts will thereupon be restored to their normal positions.

It will be apparent that the use of the porous air cleaner 102 internally of the tubular piston rod 94 conserves space, it being unnecessary to mount an air cleaner externally of the stationary motor wall 42 and bracket 40. The use of the air cleaner 69 is not essential but it is preferred merely to assist in deadening the slight noises which occur in the operation of the apparatus. Moreover, it will be noted that such noises will not be noticeable to the operator in view of the fact that the entire booster mechanism is mounted in the engine compartment, which is separated from the driver's compartment by the fire wall 10. Additionally it will be noted that since the motor is arranged wholly forwardly of the fire wall, the operator will not be conscious of any sound of air rushing into and out of the motor 41.

The present mechanism is highly important not only from the standpoint of efficient operation, but also from the standpoint of manufacture and installation. In a pedal operated hydraulic brake system of the hanging pedal type, it is the common practice to mount the master cylinder directly against the forward face of the fire wall 10. With a hanging pedal, the master cylinder will be arranged relatively high in the engine compartment and additional space is available forwardly of the conventional position of the master cylinder and above such position. The present invention takes advantage of this available space. The master cylinder is moved forwardly and supported from the fire wall as before, but the supporting means formed by the parallel walls 21 is interposed between the master cylinder and the fire wall. This provides space and mounting means for the levers 111 and 117, and the mounting of the master cylinder also provides means for effectively supporting the motor 41 in a position to render it easily connectible relative to the levers. The rod 15, which corresponds to the master cylinder piston operating rod commonly used in pedal operated systems is the only element projecting into the driver's compartment. Thus the entire mechanism is hidden from view as well as being silenced in operation.

With prior constructions in which the bellows motor has been mounted in the driver's compartment, it has been necessary to assemble the apparatus when it is installed. The present apparatus is capable of being manufactured and assembled wholly as a self-contained unit at the factory. In installing the apparatus, the whole unit including all of the parts of the apparatus to the left of the fire wall in Figures 1 and 2, together with the rod 15, may be completely assembled and packaged. It merely is necessary to project the rod 15 through the fire wall 10, bolt the bracket 18 to the fire wall and connect the master cylinder 30 to the adjacent portion of the line 35. Obviously, the entire unit may be much more easily assembled at the factory than installed element by element or unit by unit on a vehicle. The installation of the device renders it highly practicable for use both as an original installation and as an accessory installation after the car is manufactured and sold. In the latter case, the unit will be manufactured without the master cylinder 30, of course, and the unit may be installed merely by disconnecting the master cylinder from the fire wall, interposing the remainder of the unit forwardly of the fire wall, securing the unit to the fire wall, and connecting the master cylinder 30 to the bracket 27. Such installation, of course, will require the removal of the conventionally employed push rod and the connection of the push rod 15 in position.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism comprising rigid supporting means, a master cylinder fixed to said supporting means, a fluid motor fixed to said supporting means, a power lever, an operating lever, means pivotally supporting one of said levers for turning movement on an axis fixed with respect to said supporting means, the other lever being pivotally connected to said one lever at a given point spaced a predetermined distance from said axis, a valve mechanism having fluid connection with said motor and with sources of relatively high and low pressures and normally arranged to balance motor pressures, said operating lever having a free end remote from said fixed axis and spaced a greater distance than said predetermined distance from said fixed axis, said free end having mechaniscal engagement with said valve mechanism to operate it, said power lever having a free end adjacent the free end of said operating lever connected to said motor, said power lever between the free end thereof and said given point being operatively associated with said master cylinder, and means connected to said operating lever and extending from said supporting means for actuating said operating lever.

2. A mechanism according to claim 1 provided with a lost motion connection between said levers within the limits of which said operating lever is movable to operate said valve mechanism.

3. A booster brake mechanism comprising a supporting means, a master cylinder fixed to said supporting means, a fluid motor fixed to said supporting means and having a variable pressure chamber, an operating lever pivotally connected adjacent one end to said supporting means for turning movement on a fixed axis, a valve mechanism arranged to be operated by the other end of said operating lever, said valve mechanism having fluid connection with said chamber and with sources of relatively high and low pressures and normally connecting one of said sources with said chamber, operation of said valve mechanism by said operating lever disconnecting said chamber from said one source and connecting it to the other source to operate said motor, a power lever pivotally connected to said operating lever on a second axis between said fixed axis and said other end of said operating lever and connected to said motor at a point adjacent said other end of said operating lever, said power lever being operatively associated at a given point therealong with said master cylinder to operate it, said given point being between said second axis and the connection of said power lever to said motor, and means connected to said operating lever at a predetermined point thereon and extending from said supporting means for moving said operating lever to operate said valve mechanism, said predetermined point being between said fixed axis and said other end of said operating lever.

4. A mechanism according to claim 3 provided with a lost motion connection between said levers within the limits of which said operating lever is movable to operate said valve mechanism and beyond the limits of which said operating lever transmits movement to said power lever to operate said master cylinder.

5. A booster brake mechanism comprising a supporting means, a master cylinder fixed to said supporting means and having an operating rod, a fluid motor comprising a stationary head fixed to said supporting means, a movable head and a bellows connected between said heads, a valve mechanism for said motor having a normal position connecting the interior of said motor to the atmosphere and being operable for disconnecting said motor from the atmosphere and connecting it to a source of vacuum, an operating lever pivotally connected to said supporting means for turning movement on a fixed axis and having a predetermined point thereon engaging said valve mechanism to operate it, a power lever adjacent and substantially parallel to said operating lever and pivotally connected thereto for turning movement on a second axis parallel to and spaced from said fixed axis between said fixed axis and said predetermined point, said power lever being operatively associated with said operating rod between said second axis and said predetermined point, and being connected to said movable motor head adjacent said predetermined point, and means connected to said operating lever at a point spaced from said fixed axis and extending externally of said supporting means for moving said operating lever to operate said valve mechanism.

6. A mechanism according to claim 5 wherein said levers have adjacent ends remote from said fixed pivot connected respectively to said valve mechanism and to said movable motor head, and a lost motion connection between said adjacent lever ends within the range of which said operating lever is movable to operate said valve mechanism and beyond which range said operating lever transmits force to said power lever.

7. A booster brake mechanism comprising a pair of spaced stationary supporting walls, a master cylinder fixed to said supporting walls at one end thereof and having an operating rod, a fluid motor comprising a stationary head fixed to said end of said supporting walls, a movable head spaced from said stationary head and a bellows connecting said heads, a valve mechanism for controlling said motor, said valve mechanism having a normal position connecting the interior of said bellows to the atmosphere and being movable from said normal position to connect the interior of said bellows to a source of vacuum, an operating lever pivotally connected to said walls for turning movement on a fixed axis, said lever at a predetermined point spaced from said axis engaging said valve mechanism to move the latter from normal position, a power lever pivotally connected to said operating lever for turning movement on a second axis spaced from said fixed axis and between said fixed axis and said predetermined point, said power lever being connected to said movable head at a given point adjacent said predetermined point and being operatively associated with said operating rod between said second axis and said predetermined point, and a second operating rod connected to said operating lever at a point adjacent the connection of said power lever to said first-named operating rod.

8. A mechanism according to claim 7 provided with a lost motion connection between said levers within the range of which said valve mechanism is movable to connect the interior of said bellows to said source of vacuum, said operating rods being respectively pivotally connected to said levers on substantially alined axes equidistantly spaced from said fixed axis.

9. A mechanism according to claim 7 wherein said valve mechanism is carried by said movable head and comprises a valve element having an end projecting from said movable head and engaging said operating lever.

10. A booster brake mechanism comprising a pair of parallel stationary supporting walls, a bracket fixed to said supporting walls at one end thereof, a master cylinder fixed to said bracket and having an operating rod, a fluid motor comprising a stationary head fixed to said bracket, a movable head and a bellows connecting said heads and forming therewith a motor chamber, said motor being offset from said operating rod transversely thereof, a valve mechanism for said motor comprising a movable valve element having a normal position connecting said motor chamber to the atmosphere and movable to connect said chamber to a source of vacuum, an operating lever connected to said walls for turning movement on a fixed axis offset from said operating rod transversely thereof at the side thereof opposite said motor, said operating lever engaging said movable valve element, a power lever operatively associated with said operating rod and pivotally connected to said operating lever between said fixed axis and the point of connection of said power lever to said operating rod, said power lever being connected to said movable motor head, and means connected to transmit movement to said operating lever at a point thereon substantially in axial alinement with the axis of the pivotal connection of said power lever with said operating rod.

11. A mechanism according to claim 10 wherein said means for transmitting movement to said operating lever comprises a second operating rod pivotally connected to said operating lever, and a pedal lever connected to said second operating rod.

12. In combination, a motor vehicle fire wall, supporting means fixed at one end to said fire wall forwardly thereof and projecting forwardly therefrom, a master cylinder fixed to the forward end of said supporting means and having an operating rod, a motor supported by said supporting means and having a variable pressure chamber and a pressure responsive unit, a power lever connected to said pressure responsive unit and operatively associated with said operating rod at spaced points, an operating lever pivotally connected for turning movement on an axis fixed with respect to said supporting means, said power lever being pivotally connected to said operating lever at a point between said fixed axis and the point of connection of said power lever to said operating rod, a valve mechanism for controlling pressure in said motor chamber, said valve mechanism comprising a movable valve element normally connecting said chamber to the atmosphere and movable to connect such chamber to a source of vacuum, a pedal lever pivotally supported rearwardly of said fire wall, and operating means extending through said fire wall and connected at one end to said pedal lever and at its other end to said operating lever at a point spaced from said fixed axis.

13. A mechanism according to claim 12 wherein said motor comprises a stationary head fixed to said forward end of said supporting means, said pressure responsive unit comprising a movable head, said motor further comprising a bellows connecting said heads and forming therewith said variable pressure chamber.

14. A mechanism according to claim 12 wherein said motor comprises a stationary head fixed to said forward end of said supporting means, said pressure responsive unit comprising a movable head, said motor further comprising a bellows connecting said heads and forming therewith said variable pressure chamber, said valve mechanism being carried by said movable head.

15. In combination with a motor vehicle fire wall, a pair of spaced parallel vertically arranged supporting walls having rear ends fixed to said fire wall forwardly thereof, said supporting walls projecting forwardly of said fire wall, a master cylinder fixed to the forward ends of said supporting walls and having an operating rod, a fluid motor arranged above said supporting walls and having a forward end supported by the forward ends of said supporting walls, said motor having a variable pressure chamber and a pressure responsive unit, a valve mechanism comprising a movable valve element normally arranged to connect said motor chamber to the atmosphere and movable to connect such chamber to a vacuume source, an operating lever arranged between said side walls and having a lower end pivotally connected to said side walls for turning movement on a fixed pivot pin carried by said side walls below said operating rod, the upper end of said operating lever engaging said valve element to move it, a power lever operatively associated with said operating rod at a given point spaced above said fixed pivot pin and below said upper end of said operating lever, said power lever being pivotally connected to said operating lever for turning movement on an axis between said fixed pivot pin and the point of connection of said power lever with said operating rod, and means projecting through said fire wall for moving said operating lever, said means being connected to said operating lever at a point spaced above said fixed pivot pin.

16. A mechanism according to claim 15 wherein said motor comprises a stationary head fixed with respect to said supporting walls, said pressure responsive unit comprising a movable head, and a bellows connected between said heads and forming therewith said motor chamber.

17. A mechanism according to claim 15 wherein said motor comprises a stationary head fixed with respect to said supporting walls, said pressure responsive unit comprising a movable head, and a bellows connected between said heads and forming therewith said motor chamber, said valve mechanism being carried by said movable head.

18. A mechanism according to claim 15 wherein said means projecting through said fire wall comprises a second operating rod pivotally connected at its forward end to said operating lever, and a pedal lever rearwardly of said fire wall pivoted to the other end of said second operating rod.

References Cited in the file of this patent

UNITED STATES PATENTS

| | | |
|---|---|---|
| 1,533,093 | Booth | Apr. 14, 1925 |
| 2,129,851 | Lee | Sept. 13, 1938 |
| 2,358,753 | Willet | Sept. 19, 1944 |
| 2,690,740 | Hupp | Oct. 5, 1954 |

FOREIGN PATENTS

| | | |
|---|---|---|
| 175,501 | Austria | July 25, 1953 |
| 284,083 | Italy | Mar. 31, 1931 |